United States Patent [19]

Egner-Walter et al.

[11] Patent Number: 5,372,308
[45] Date of Patent: Dec. 13, 1994

[54] WASHING SYSTEM, ESPECIALLY FOR WINDSHIELDS OF A MOTOR VEHICLE

[75] Inventors: Bruno Egner-Walter, Heilbronn; Hans-Michael Gloss, Brackenheim-Stockheim; Jiri Mach, Leutenbach, all of Germany

[73] Assignee: SWF Auto-Eletric GmbH, Germany

[21] Appl. No.: 98,350

[22] PCT Filed: Nov. 28, 1992

[86] PCT No.: PCT/EP92/02759
§ 371 Date: Aug. 4, 1993
§ 102(e) Date: Aug. 4, 1993

[87] PCT Pub. No.: WO93/11980
PCT Pub. Date: Jun. 24, 1993

[30] Foreign Application Priority Data

Dec. 11, 1991 [DE] Germany ............ 4140731

[51] Int. Cl.[5] ............ B05B 1/10; B05B 7/24
[52] U.S. Cl. ............ 239/284.1; 239/398; 239/498
[58] Field of Search ............ 239/284.1, 284.2, 302, 239/304, 398, 433, 498; 15/250.01; 137/268; 366/262

[56] References Cited

U.S. PATENT DOCUMENTS

| | | | |
|---|---|---|---|
| 3,286,932 | 11/1966 | Kibler | 239/284.1 |
| 4,218,018 | 8/1980 | Seibicke et al. | 239/284.2 |
| 4,331,295 | 5/1982 | Warihashi | 239/284.1 |
| 4,790,454 | 12/1988 | Clark et al. | 239/304 X |
| 4,805,154 | 2/1989 | Schneider | 366/262 X |
| 4,824,021 | 4/1989 | Binder | 239/284.1 |

FOREIGN PATENT DOCUMENTS

| | | | |
|---|---|---|---|
| 0284662 | 10/1988 | European Pat. Off. | |
| 1031152 | 5/1958 | Germany | 239/284.1 |
| 1405434 | 12/1968 | Germany | 15/250.01 |
| 1813638 | 6/1970 | Germany | 15/250.01 |
| 2062720 | 7/1972 | Germany | |
| 3342384 | 6/1984 | Germany | |
| 3729025 | 3/1989 | Germany | 15/250.01 |
| 3730006 | 3/1989 | Germany | |
| 9103554.6 | 7/1991 | Germany | |
| 59-184045 | 10/1984 | Japan | |
| 9111350 | 8/1991 | WIPO | 15/250.01 |
| PCT/ES9100-076 | 5/1992 | WIPO | |

Primary Examiner—Andres Kashnikow
Assistant Examiner—Lesley D. Morris
Attorney, Agent, or Firm—Robert P. Seitter; J. Gordon Lewis

[57] ABSTRACT

A washing system for windshields of motor vehicles including a tank for washing water, a tank for a washing powder, and a washing pump. Water is drawn from the tank, and mixed with washing powder. The mixture of washing water and washing powder is transported to a washing nozzle for depositing on the windshield of a vehicle. Washing powder can be added to the washing water in the intake section of the pump.

18 Claims, 3 Drawing Sheets

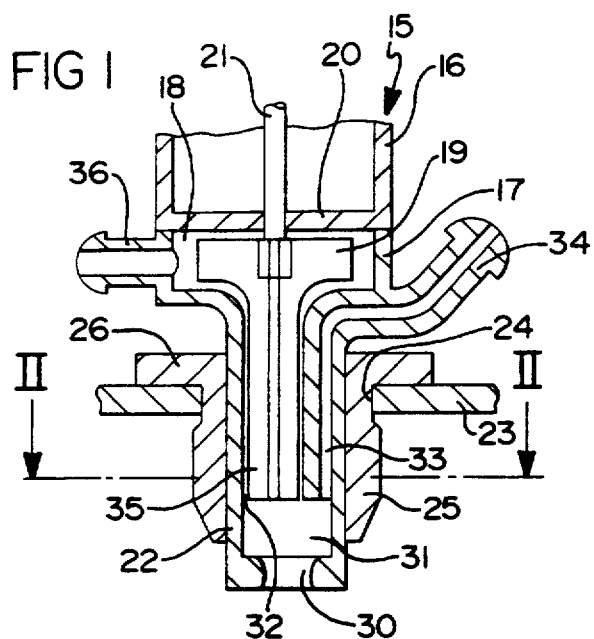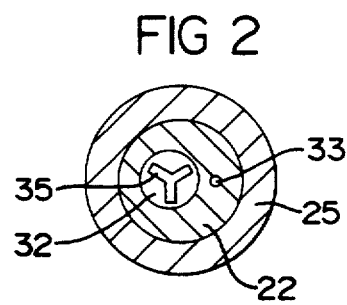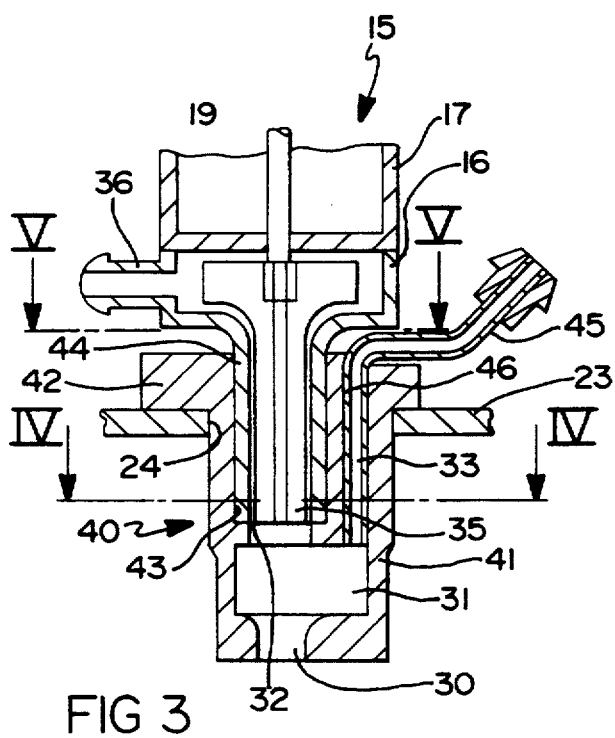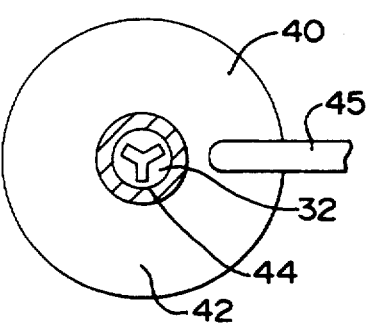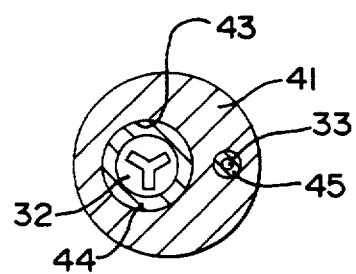

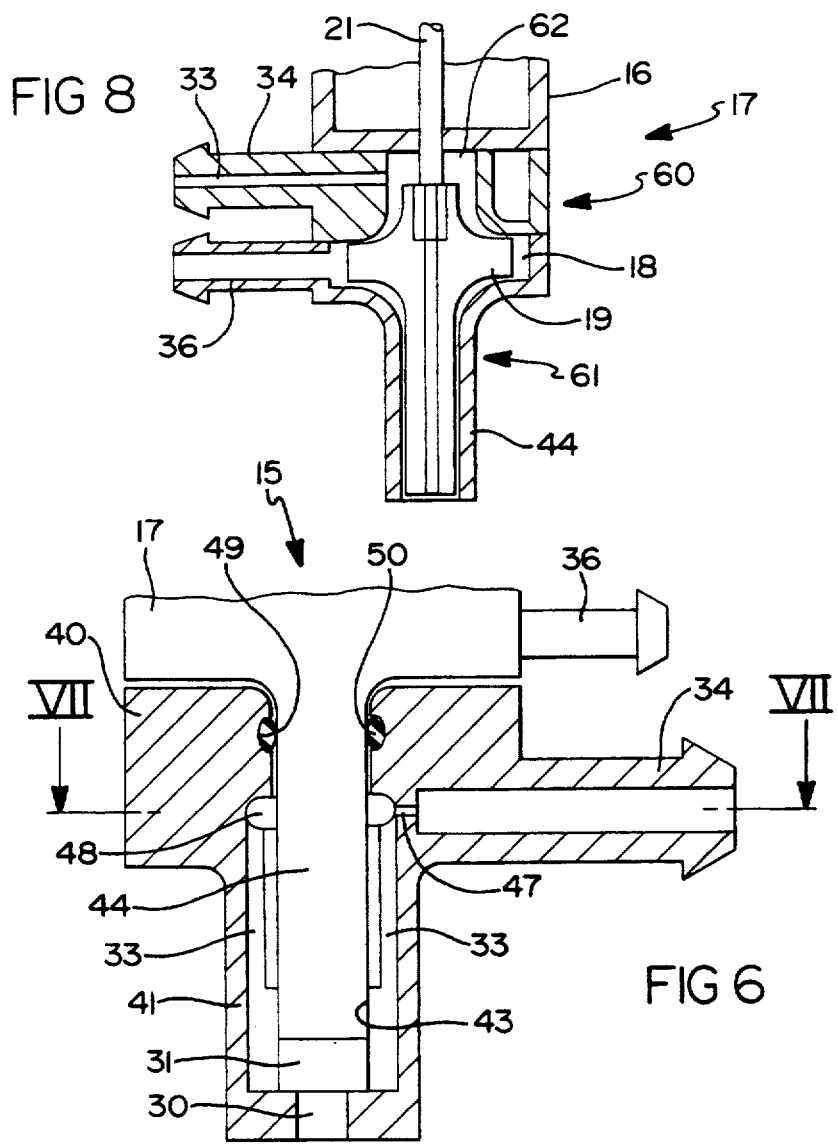

1

WASHING SYSTEM, ESPECIALLY FOR WINDSHIELDS OF A MOTOR VEHICLE

BACKGROUND OF THE INVENTION

The invention relates to a washing system, and more particularly to a washing system for a windshield of a motor vehicle.

Washing systems that provide for cleaning the windshields of motor vehicles with a tank for washing water and another tank for a washing powder are known from a number of printed applications. For example, DE-OS 20 62 720 or DE-AS 29 21 158 show a washing system, wherein a pump is assigned to each of the two tanks which can be switched on independently of the other pump. In this washing system it is possible to spray only washing water, only washing powder, or washing water and washing powder together onto a windshield. If it is planned to spray washing water and washing powder always together onto the windshield, a solution with two pumps is complicated and expensive.

From DE-OS 30 15 348 a washing system is known comprising a washing pump with an impeller which can be driven in opposite directions of rotation. In case it is actuated into the one direction of rotation, only washing water from a first tank is supplied, and in case of an actuation of the impeller into the opposite direction of rotation, only washing powder from the second tank is supplied. In this washing system only one single pump is used in order to transport both fluids, however, the construction of the pump with different valves as well as the electric switch for reversing the poles of the electric motor driving the pump make this solution also relatively expensive. Furthermore, it is not possible to spray washing water and washing powder simultaneously onto a windshield, other than in a washing system with two pumps.

In DE-OS 20 62 720 a washing system is disclosed in which one pump is used for supplying both fluids. This pump takes in the two fluids via a distributing valve and the valve allows both to select between washing powder and washing water and also to select as to the mixing proportion desired for the combination of both fluids. It is possible to operate the valve manually, by motor, magnetically or also pneumatically.

A washing system is known from DE-OS 33 42 384, in the case of which a diaphragm-type or piston-type pump is assigned to the container with washing powder. When second pump (washing pump) transporting washing water is switched on, the washing powder pump is operated by the pressure of the washing water prevailing at the one side of the piston or the diaphragm, respectively, and which adds a certain amount of washing powder to the washing fluid. That means, at the beginning of a washing process a mixture of washing water and washing powder and afterwards only washing water is sprayed onto the windshield which is to be cleaned.

As described above, there are washing systems for windshields of motor vehicles, which comprise a tank for washing water and a tank for a washing powder and wherein a mixture of washing water and washing powder can be sprayed on the windshield which is to be cleaned. Also, windshield washing systems have already been suggested, in which it is exclusively possible to have washing powder and washing water as a mixture exit from the washing nozzles during the whole washing process. At first sight, it seems unnecessary in this case to provide separate tanks for the washing water and the washing powder. On the contrary, one single tank could be sufficient for the mixture. It has to be considered though that, when filling up the only existing washing fluid tank, the mixture has to be made by the owner of the motor vehicle himself or by somebody in charge. It is to be expected that in this case the optimal mixing proportions defined by the motor vehicle manufacturer, are not achieved. If there is too much washing powder in the washing fluid it is costly to operate and wastes washing powder. If there is not enough washing powder in the washing fluid it is not guaranteed that the windshield will be properly cleaned. Therefore, it is also advantageous in such a washing system, where a mixture of washing water and washing powder is supplied, to provide separate tanks for the two fluids and to achieve the mixing proportions by an appropriate construction of the washing system. To this end it has already been suggested to provide a venturi nozzle between a transport pump and the spraying nozzles. The venturi nozzles draw washing powder into the flow of washing water where the two solutions are mixed. However, the presence of the venturi nozzle impedes the flow of the fluid through the fluid supply line. Therefore, in the original equipment of a motor vehicle a stronger pump is necessary. Besides, retrofitting of a motor vehicle involves difficulties, it is necessary to replace both the venturi nozzle and the washing pump. Additionally, the presence of a venturi nozzle generally requires a larger capacity pump than that required on non-venturi systems. Apart from the additional costs caused hereby, it is also questionable, whether this stronger pump can be mounted in the same position as the old pump.

SUMMARY OF THE INVENTION

One object of this invention is to provide a washing system in which washing water and washing powder are transported as mixture, in which the washing powder is always added in the right dosage and in which the intake of the washing powder necessitates only little power. Another object is to provide a two tank washing system which can be retrofitted to a single tank system using little effort and introducing few additional parts into a washing system.

These objects are achieved by the present invention in that the washing powder can be added to the washing water in the pump intake area. With the present system, the capacity of the pump is only slightly decreased when the washing water is added in the intake area of the pump. Typically losses of pressure up to 50% have to be accepted when using a venturi system (or have to be offset by using a stronger pump); however, in case of a washing system according to the present invention, losses of pressure only occur in the amount of approximately 10%. This loss is so small there is no appreciable effect in the discharge pattern of the washing nozzle. This pumps on existing single tank systems and can be retrofit with the two tank systems of the present invention. Advantageous embodiments of a washing system according to the invention can be taken from the subclaims.

Washing pumps today used in windshield washing systems of motor vehicles usually comprise an intake piece, in which an intake channel for washing water leads into a pump chamber of the washing pump and which intake piece extends into this tank through an opening in the tank for the washing water. In a preferred embodiment, the washing powder can be taken in through this intake channel of the intake piece. In particular the washing powder is added to the intake channel from outside of the tank to the washing water in the inside of said tank. In order to keep the number of the openings to be sealed in the tank for the washing water small, it is especially favorable that the washing powder reaches into the inside of this tank through the same opening through which the intake piece of the washing pump extends into the tank for the washing water.

In known pumps the intake channel is arranged axially and centrally to an impeller situated in the pump cheer. The impeller reaches into the intake channel with a twirling stick provided with short radial vanes so that already in the intake channel a spiral flow of the fluid taken in is produced during the operation of the washing pump. The inlet of the washing powder into the intake channel lies in front of the twirling stick. For this reason, the flow of the fluid is no more disturbed along the length of the twirling stick.

It is especially advantageous for taking in the washing powder that there is an access from the tank of the washing water to the intake channel in front of the inlet of the washing powder into the intake channel, the cross-section of which access is at most only as large as the cross-section of the intake channel, however, preferably smaller.

In an especially preferred embodiment of a washing system according to the invention the washing pump comprises an intake channel arranged axially and centrally to an impeller situated in a pump chamber and a supply channel running beside said intake channel for the washing powder running in parallel to the intake channel with the intake channel and the supply channel being situated in one single connection piece, with the help of which the washing pump can be inserted into an opening of the tank for the washing water. This connection piece is preferably developed centrally to the intake channel at its outside. In washing pumps (which employ electric motors) for windshield washing systems of motor vehicles the electrical motor commonly employs a driving part this is concentric to the intake channel beside the pump cheer. If the connection piece with the intake channel and the supporting channel, which can be inserted in the tank with washing water, is developed centrally to the intake channel, the arrangement of the washing pump at the tank remains independent the angle at which the connection piece is inserted into the tank. A washing pump can be assembled at the washing water tank only in a certain restricted area of the angle, because of a pressure joint eventually disturbing the symmetry or because of a plug for electrical connections. This area of the angle, however, may be large enough to influence the position of the washing pump, with the intake piece being eccentrical, in the way that the assembly is impaired or is not carried out in an exact way.

The diameter of an intake piece containing an intake channel and a supply channel and being arranged centrally to the impeller can be kept small if an inlet channel for the washing powder opens into a ring channel surrounding the intake piece, from which ring channel the washing powder can be conveyed to the inlet in the intake channel at the outside of the intake piece. Preferably, several axial channels of limited width start from the ring channel so that, seen peripherally, a support of the material forming the channels at the connection piece surrounding the intake channel can be made between the channels. The several axial channels are preferably equally distributed around the connection piece containing the intake channel so that the washing water reaches into the intake channel at several points distributed peripherally and in this way is mixed with the washing water especially well. More particularly if there are only two axial channels, they are preferably diametrically opposite each other with regard to the intake channel.

In order to be able to retrofit customary washing systems easily and to be able to use equal pumps for different washing systems an adapter is advantageous, comprising a recess for placing on an intake piece of the washing pump and a supply channel for the washing powder opening into a cheer in front of the intake piece, which adapter can be inserted into an opening in the tank for the washing water. In this case it seems especially advantageous that the adapter is made of rubber and the opening in the tank can be sealed with said adapter. The adapter replaces the rubber sealing already up to now necessary in such a way that the expenditure for parts is small.

In the embodiments of a windshield washing system for motor vehicles according to the invention regarded up to now, the washing powder is taken in through the intake channel, through which the washing water also reaches into the pump chamber of the washing pump. In contrast a preferred embodiment is shown, in which the washing pump comprises an intake channel for the washing water opening into a pump chamber with an impeller and comprising an access to the pump chamber for the washing powder independently of this intake channel.

Advantageously, the intake channel for the washing water opens into the pump chamber at the one side of the impeller, while the washing powder can be supplied to the pump chamber at the other side of the impeller. Expediently, the impeller will then be designed as two-sided impeller, the vanes of which become axially longer on both sides with the distance towards the axis of the impeller decreasing.

The access into the pump cheer for the washing powder can be situated on the same side of the impeller as the one for the washing water and can be situated especially farther outside than the one for the washing water.

To prevent the washing powder from gradually flowing into the tank for the washing water, when the washing system is not in operation, it is provided that the washing powder can be supplied to the washing pump through a return valve. The dosage of the washing powder can be adjusted by a restrictor, via which the washing powder can be taken in by the washing pump.

Several embodiments of a washing system according to the invention are illustrated in the drawings. The invention is explained in detail by way of the attached drawings in which:

BRIEF DESCRIPTION OF THE DRAWINGS

FIG. 1 is a sectional view through a washing pump with a connection piece, by means of which the pump is inserted in a tank for washing water and which contains a supply channel for a washing powder and an intake channel for washing water and the washing powder, FIG. 2 is a sectional view along the line II—II of FIG. 1, FIG. 3 is a sectional view similar to that of FIG. 1 through a second embodiment, in which an adapter is placed on an intake piece of the washing pump, FIG. 4 is a sectional view along line IV—IV of FIG. 3, FIG. 5 is a sectional view along line V—V of FIG. 3, FIG. 6 is a sectional view similar to that of FIGS. 1 and 3 through a third embodiment, in which an adapter is centrally placed on the intake piece of the washing pump, FIG. 7 is a sectional view along line VII—VII of FIG. 6, FIG. 8 is a sectional view through a forth embodiment in which the washing powder opens into the pump chamber independently of the intake piece for the washing water.

DETAILED DESCRIPTION OF THE PREFERRED EMBODIMENTS

Figure 9:
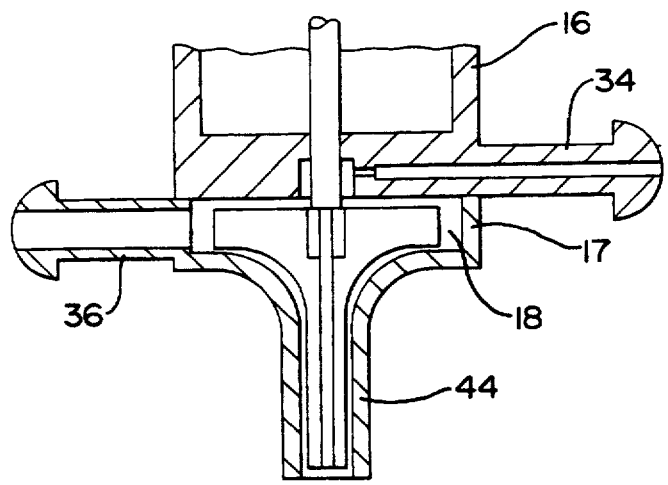
FIG. 9 is a cross sectional view of a further embodiment with an access to the pump chamber independently of the washing powder.

A washing pump 15 with an essentially cylindric housing 16 for a small electric motor and with a pump housing 17 can be seen in FIG. 1, which is connected with the motor housing 16 in the conventional way. The pump housing contains a pump chamber 18 accommodating an impeller 19. The impeller is placed twist-safe on a rotor shaft 21 of the electric motor which is closely led through a dividing wall 20 between the motor housing 16 and the pump housing 17. The pump housing 17 is continued in a connection piece 22 in an axial direction. The impeller 19 (by means of connection piece 22 and washing pump 15) is inserted in a tank 23 for washing water. For this purpose, this tank is provided with an opening 24, which is sealed by a rubber sealing 25, which is situated between the connection piece 22 and the edge of the opening 24 and which also bears against the tank 23 with an outside flange 26 around the opening 24.

The connection piece 22 is provided with a narrowed access 30 at its front end, which turns to a cheer 31 with a larger diameter. This cheer is in the inside of the tank 23. An intake channel 32 starts from this chamber, which intake channel runs coaxially to the axis of the impeller 19 and which then opens into the pump cheer 18. Laterally beside the intake channel 32 a supply channel 33 for a washing powder opens into the chamber 31, which supply channel leads away from the intake channel 32 at the outside of the tank 23 and which supply channel ends in a connection piece 34 for a line not shown in detail, diagonally pointing away from the tank 23. Via this supply channel 33 washing powder from outside of the tank 23 reaches into the cheer 31 in the inside of the tank 23. The diameter of the access 30 is smaller than the diameter of the intake channel 32, by way of which the washing powder is taken in. On the whole, the connection piece 34 has a round outside cross-section and is arranged centrally to the axis of the impeller 19.

The wings of the impeller 19 are axially extended towards the intake channel 32 and extend into the intake channel as far as to the chamber 31. The outlet of the supply channel 33 into the intake channel is situated in front of the twirling stick 35, which is formed by the radially short wings of the impeller 19 extending into the intake channel 32.

A pressure joint 36 comes off the pump chamber 18 tangentially, which pressure joint 36 can be connected with a line leading to one or several washing nozzles.

A return valve, not shown in detail, is fitted into the line between the tank for the washing powder and the connection piece 34, which return valve prevents the water from flowing into this tank automatically, when there is low water in the tank 23. There is also a restrictor fitted into the line, by means of which the dosage of the washing powder in the washing water is controlled. The restrictor may also be a narrowing in the supply channel 33, which is situated at its inlet into the chamber 31.

When the electric motor of the washing pump 15 is switched on, said electric motor drives the impeller 19 and the twirling stick 35. Via the access 30 to the tank 23 washing water and via the supply channel 33 washing powder is taken in. Within the intake channel 32 and in the pump chamber 19 the washing powder and washing water are mixed together so that a mixture of washing water and washing powder is given to the washing nozzles via the pressure joint 36, which is sprayed onto the windshield of the motor vehicle by said nozzles. In this system, the dosage of the washing powder remains always equal. This is in comparison to single tank—premixed systems wherein the dosage depends on the amount of washing water and washing powder which is filled into the store tank.

The embodiment according to FIGS. 3 to 5 is different from the one according to FIGS. 1 and 2 in the way that the supply channel 33 for the washing powder is not integrally developed in the pump housing 17, but is placed in an adapter 40 made from rubber. The adapter is developed as rubber stopper with a connection piece 41, by means of which it extends into the tank 23 through an opening 24 and with an outside flange 42, by means of which it lies on the tank 23, around the outside of the opening 24. The adapter is provided with an axial recess 43, running centrally to the axis of the impeller 19 and into which recess an intake piece 44 is inserted, integrally developed with the pump housing. The supply channel 33 is situated in a metal pipe 45, being inserted in a recess 46. Recess 46 has a smaller diameter than, and runs generally parallel to recess 43. Metal pipe 45 diagonally points away from the tank 23 at the outside of the tank 23. In front of the intake piece 44 and the supply channel 33 the chamber 31 is situated in the adapter 40, with an access 30 again leading into the chamber narrowed with regard to the diameter of the intake channel 32 in the intake piece 44. Similar to the connection piece 22 in the embodiment according to FIGS. 1 and 2, the connection piece 41 of the adapter 40 is arranged eccentrically to the axis of the impeller 19 also in the embodiment according to FIGS. 3 to 5.

Furthermore, the construction of the impeller 19 with the twirling stick 35, the construction of the pump housing 17 and the arrangement of the pressure joint 36 is the same as in the embodiment according to FIGS. 1 and 2. The adapter made from rubber is also used in order to seal the opening 24 in the tank 23 so that an additional rubber sealing is not necessary. Also no additional sealing is necessary between the intake piece 44 and the adapter 40.

In the embodiment according to FIGS. 6 and 7 an adapter 40 is also plugged on the intake piece 44 of the pump housing 17 running axially and centrally, from which, furthermore, the pressure joint 36 can be recognized. The adapter 40 again is stopper-shaped with a connection piece 41, by means of which it can be plugged through an opening of a tank for washing water, not shown in detail in FIGS. 6 and 7. Different from the embodiment according to FIGS. 3 and 5 the adapter is now made from a firm plastic material. Furthermore, the connection piece 41 is arranged coaxially to the intake piece 44. The connection piece 34 for a line leading to the tank with the washing powder runs radially to the connection piece 41. At the inlet point of the choke 47 into the ring channel 48 and diametrically opposite an axial supply channel 33 starts and runs from the ring channel 48 (along the intake channel 44) to a chamber 31 situated in front of this intake piece and developed in the connection piece 41 of the adapter 40. The inside diameter of the recess 43 corresponds to its outside diameter only in the front area of the intake channel 44. Towards the ring channel 48 the diameter of the recess 43 is larger than the outside diameter of the intake channel 44 so that, there, the supply channels 33 seems less deep and the washing powder can flow around the whole intake piece 44. The washing powder can reach the chamber only by flowing through the channels 33.

So that no fluid comes to the outside between the adapter 40 and the pump housing 17, the adapter 40 is provided with a further ring channel 49 above the ring channel 48, into which ring channel 49 an O-ring 50 is inserted, bearing against the intake piece 44.

The washing pump according to FIG. 8 is again provided with a motor housing 16 and with a pump housing with a pump chamber 18, in which an impeller 19 is situated. The pump housing comprises a top part 60 and a bottom part 61, wherein this bottom part 61 corresponds to the pump housing of the embodiment according to FIGS. 3 to 5 respectively 6 and 7, to a great extent. The bottom part 61 has an intake piece 44, by means of which the washing pump can be inserted into a tank for washing water, and a pressure joint 36, at which a line is connected leading to one or several washing nozzles. Between the motor housing 16 and the bottom part 61 of the pump housing 17 the top part 60 of the pump housing 17 is inserted, which top part 60 is provided with a radially protruding connection piece 34, onto which a hose can be plugged, leading to a tank with a washing powder.

The supply channel 33 placed in the connection piece 34 leads as far as near the driving shaft 21 and there opens into a central funnel 62 of the pump chamber 18 pointing to the motor housing 16. The impeller 19 now comprises radially short vanes on both sides of the pump cheer 18, wherein these vanes are axially essentially shorter at the side of the funnel 62 than at the side of the intake piece 44. At any case the wings are also extending into the funnel 62.

When the washing pump is switched on, it takes in washing powder via the connection piece 34 and washing water via the connection piece 44. The two fluids are mixed in the pump chamber and supplied as mixture to the washing nozzle via a pressure joint 36.

Also, in the embodiment according to FIG. 9 the washing powder is supplied to the pump chamber 18 at the side being opposite to the intake piece 44. Different from the embodiment according to FIG. 8 the connection piece 34 is now situated in the motor housing 16 so that the pump housing 17 can be manufactured as building component in one piece.

Figure 10:
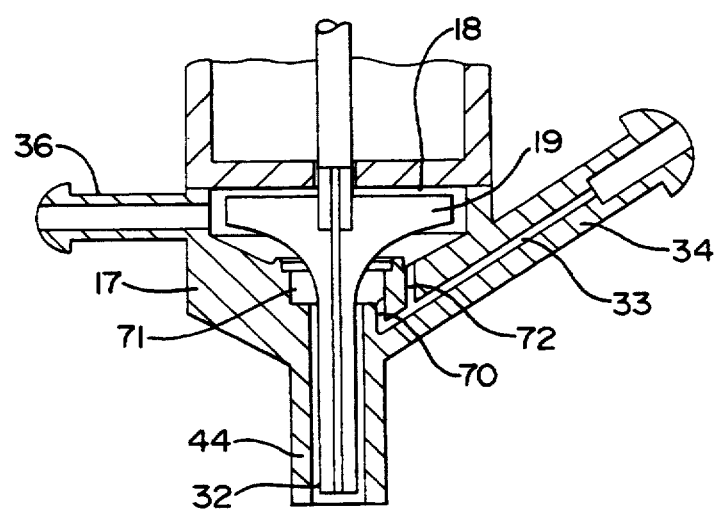
FIG. 10 is a cross sectional view of a last embodiment in which the washing powder opens into pump chamber also independently of the washing water but is supplied on the same side of the impeller as the washing water.

Also, in the embodiment according to FIG. 10 the washing powder is supplied to the pump cheer 18 independently of the intake channel 44 for the washing water via a connection piece 44. Water and washing powder now reach the pump chamber 18 at the same side of the impeller 19. As well the connection piece 34 as the pressure joint 36 are situated at the pump housing 17, which, however, is developed different from the embodiment according to FIG. 8, nevertheless is integrally developed.

In FIG. 10 two possibilities for an outlet of a supply channel 33 for the washing powder into the pump chamber 18 are indicated. The one outlet 70 is close to the axis of the impeller 19 and is possible by means of a radial widening 71 of the intake channel 32 near the impeller. The other outlet 72 leads directly into the pump chamber 18 radially further outside.

What is claimed is:

1. A washing system, of the type including a washing water tank for holding washing water and a washing powder tank for holding washing powder, comprising:
   a washing pump serving to take in washing water from the washing tank, to add washing powder from the washing powder tank to the washing water and to transport a mixture of washing water and washing powder to a washing nozzle,
   wherein the washing pump includes an intake area and the washing powder is added to the washing water in the intake area of the washing pump,
   wherein the washing pump comprises an intake piece with an intake channel for drawing washing water into a pump chamber, and said washing powder being taken in through said intake channel,
   wherein the washing powder is supplied to the intake channel by a supply channel that runs in parallel to the intake channel and opens axially into a chamber of a larger cross-section than that of the intake channel, and
   wherein an access area of a smaller cross-section than that of the supply channel is situated between the washing powder tank and the powder supply channel.

2. A washing system according to claim 1, wherein the washing pump has an intake channel arranged axially and centrally to an impeller situated in a pump chamber, in that a supply channel for the washing powder runs in parallel to the intake channel next to it, and in that the washing pump with a connection piece containing the intake channel and the supply channel is inserted in an opening of the tank for the washing water.

3. A washing system according to claim 2, wherein the connection piece is centrally to the intake channel.

4. A washing system according to claim 3, wherein an inlet channel for the washing powder opens into a ring channel surrounding the intake piece, from which ring channel the washing powder can be conveyed in several axial channels of limited width at the outside of the intake piece up to the inlet in the intake channel.

5. A washing system according to claim 4, including an adapter comprising a recess for placing on an intake piece of the washing pump and a supply channel for the washing powder opening into a chamber in front of the intake piece, which adapter can be inserted in an opening in the washing water tank.

6. A washing system according to claim 1, wherein the washing pump comprises an intake channel for the washing water opening into a pump chamber with an impeller and comprises a supply channel to the pump chamber for the washing powder independently of this intake channel.

7. A washing system according to claim 6, wherein the intake channel for the washing water runs especially centrally to said intake channel axially into the pump chamber on the one side of the impeller, and in that the washing powder can be supplied to the pump chamber on the other side of the impeller especially centrally to said impeller.

8. A washing system according to claim 7, wherein the impeller has vanes that become axially longer as the distance along the axis of the impeller decreases.

9. A washing system according to claim 6, wherein the intake channel for the washing water opens axially into the pump chamber on the one side of the impeller especially centrally thereto, and in that the access to the pump chamber for the washing powder is situated on the same side of the impeller as the one for the washing water.

10. A washing system according to claim 9, wherein a restrictor via which the washing powder can be taken in by the washing pump.

11. A washing system according to claim 6, wherein the washing pump is composed of a pump housing with a bottom part and a top part between the bottom part and a motor housing, and in that at the bottom part of the pump housing an intake piece for washing water and in the top part of the pump housing a supply channel for the washing powder is situated.

12. A washing system according to one of the claim 6, wherein the washing pump is composed of a pump housing and a motor housing, and in that an intake piece for washing water is situated at the pump housing and a supply channel for the washing powder is arranged at the motor housing.

13. A washing system according to claim 1, wherein said intake piece of the washing pump reaches into the washing water tank through an opening, and the washing powder is led to the intake channel from outside of this tank through its inside.

14. A washing system according to claim 13, wherein the washing powder is conveyed to the inside of the washing powder tank through the same opening through which the intake piece of the washing pump extends into the tank.

15. A washing system according to claim 1, wherein the intake channel is arranged axially and centrally to an impeller situated in the pump chamber, in that the impeller extends into the intake channel by means of a twirling stick radially provided only with short vanes, and in that the admission of the washing powder into the intake channel lies in front of this twirling stick.

16. A washing system, of the type including a washing water tank for holding washing water and a washing powder tank for holding washing powder, comprising:

a washing pump serving to take in washing water from the washing tank, to add washing powder from the washing powder tank to the washing water and to transport a mixture of washing water and washing powder to a washing nozzle,
wherein the washing pump includes an intake area and the washing powder is added to the washing water in the intake area of the washing pump,
wherein the washing pump comprises an intake piece with an intake channel for drawing washing water into a pump chamber, and said washing powder being taken in through said intake channel,
wherein the intake channel is arranged axially and centrally to an impeller situated in the pump chamber, in that the impeller extends into the intake channel by means of a twirling stick radially provided only with short vanes, and in that the admission of the washing powder into the intake channel lies in front of this twirling stick.

17. A washing system, of the type including a washing water tank for holding washing water and a washing powder tank for holding washing powder, comprising:

a washing pump serving to take in washing water from the washing tank, to add washing powder from the washing powder tank to the washing water and to transport a mixture of washing water and washing powder to a washing nozzle,
wherein the washing pump includes an intake area and the washing powder is added to the washing water in the intake area of the washing pump,
wherein the washing pump comprises an intake piece with an intake channel for drawing washing water into a pump chamber, and said washing powder being taken in through said intake channel,
wherein said intake piece of the washing pump reaches into the washing water tank through an opening, and the washing powder is led to the intake channel from outside of this tank through its inside.

18. A washing system, of the type including a washing water tank for holding washing water and a washing powder tank for holding washing powder, comprising:

a washing pump serving to take in washing water from the washing tank, to add washing powder from the washing powder tank to the washing water and to transport a mixture of washing water and washing powder to a washing nozzle,
wherein the washing pump includes an intake area and the washing powder is added to the washing water in the intake area of the washing pump,
wherein the washing pump comprises an intake channel for the washing water opening into a pump chamber with an impeller and comprises a supply channel to the pump chamber for the washing powder independently of this intake channel.

* * * * *